United States Patent
Lee et al.

(10) Patent No.: US 9,969,878 B2
(45) Date of Patent: May 15, 2018

(54) POLYALKYLENE CARBONATE RESIN COMPOSITION HAVING HIGH THERMAL STABILITY

(71) Applicants: SK Innovation Co., Ltd., Seoul (KR); SK Global Chemical Co., Ltd., Seoul (KR)

(72) Inventors: Ho Seong Lee, Daejeon (KR); Yang Eun Lee, Daejeon (KR); Je Ho Lee, Daejeon (KR)

(73) Assignees: SK Innovation Co., Ltd., Seoul (KR); SK Global Chemical Co., Ltd., Seoul (KR)

( * ) Notice: Subject to any disclaimer, the term of this patent is extended or adjusted under 35 U.S.C. 154(b) by 212 days.

(21) Appl. No.: 14/918,135

(22) Filed: Oct. 20, 2015

(65) Prior Publication Data

US 2016/0122535 A1 May 5, 2016

(30) Foreign Application Priority Data

Oct. 31, 2014 (KR) .......................... 10-2014-0150533

(51) Int. Cl.

| | | |
|---|---|---|
| *C08G 59/40* | (2006.01) | |
| *C08G 59/20* | (2006.01) | |
| *C08G 59/42* | (2006.01) | |
| *C08G 59/44* | (2006.01) | |
| *C08G 59/50* | (2006.01) | |
| *C08G 59/66* | (2006.01) | |
| *C08L 63/00* | (2006.01) | |
| *C08L 69/00* | (2006.01) | |

(52) U.S. Cl.
CPC .............. *C08L 69/00* (2013.01); *C08L 63/00* (2013.01); *C08L 2201/08* (2013.01); *C08L 2201/10* (2013.01); *C08L 2205/05* (2013.01)

(58) Field of Classification Search
None
See application file for complete search history.

(56) References Cited

U.S. PATENT DOCUMENTS

| | | | | |
|---|---|---|---|---|
| 3,305,527 A | * | 2/1967 | Price | ...................... C08G 59/14 525/382 |
| 4,912,149 A | | 3/1990 | Robeson et al. | |
| 4,946,884 A | | 8/1990 | Kuphal et al. | |
| 2015/0099829 A1 | * | 4/2015 | Hong | ...................... C08G 64/34 523/400 |

FOREIGN PATENT DOCUMENTS

| | | | |
|---|---|---|---|
| KR | 20090090154 A | 8/2009 | |
| KR | 1020100013255 A | 2/2010 | |
| KR | 1020100067593 A | 6/2010 | |
| KR | 1020130124199 A | 11/2013 | |
| WO | WO 03/029240 A1 * | 4/2003 | ........... C07D 317/36 |
| WO | WO 2013/165214 A2 * | 11/2013 | ............. C08L 69/00 |

OTHER PUBLICATIONS

Machine translation of WO 03/029240 A1 (no date).*

* cited by examiner

*Primary Examiner* — Michael J Feely
(74) *Attorney, Agent, or Firm* — The Webb Law Firm

(57) ABSTRACT

Provided is a polyalkylene carbonate resin composition having high thermal resistance including: polyalkylene carbonate obtained by reacting carbon dioxide with one or two or more different epoxide compound(s) selected from the group consisting of C2-C10 alkylene oxide unsubstituted or substituted with halogen or alkoxy, C4-C20 cycloalkylene oxide unsubstituted or substituted with halogen or alkoxy, and C8-C20 styrene oxide unsubstituted or substituted with halogen, alkoxy, alkyl or aryl; an epoxy resin; and a curing agent.

20 Claims, No Drawings

POLYALKYLENE CARBONATE RESIN COMPOSITION HAVING HIGH THERMAL STABILITY

CROSS-REFERENCE TO RELATED APPLICATION

This application claims priority to Korean Patent Application No. 10-2014-0150533 filed Oct. 31, 2014, the disclosure of which is hereby incorporated in its entirety by reference.

TECHNICAL FIELD

The following disclosure relates to a polyalkylene carbonate resin composition capable of implementing high thermal resistance. More specifically, the following disclosure relates to a polyalkylene carbonate resin composition having high thermal resistance, capable of implementing excellent thermal resistance, transparency and adhesion by including cross-linking of polyalkylene carbonate and an epoxy resin.

BACKGROUND

Recently, an effort into reduction of greenhouse gas as a solution for global warming has been globally expanded. In particular, for reduction of emissions of carbon dioxide and regeneration, progress of industrialization of polyalkylene carbonate using a catalyst has been accelerated. The polyalkylene carbonate is a rubber plastic which is soft at room temperature due to unique characteristic, and has significantly excellent processability and excellent decomposition ability. Accordingly, a research into the polyalkylene carbonate as a biodegradable polymer has been actively conducted. However, the polyalkylene carbonate has limitations in being applied to various fields due to a low glass transition temperature (Tg) and easy degradability around 200° C. Accordingly, technology of increasing the glass transition temperature or thermal resistance or improving mechanical strength by blending with various resins has been required. For example, U.S. Pat. No. 4,946,884 discloses a resin composition including a melt-blend of polypropylene carbonate and polymethyl methacrylate (PMMA) or including a binder for molding ceramic or metallic powders, and U.S. Pat. No. 4,912,149 discloses a melt-blend of polyvinylchloride acetate to improve mechanical properties. In addition, Korean Patent Laid-Open Publication No. 10-2013-0124199 discloses an interpenetrating cross-linking composition using a polyalkylene carbonate resin having a high molecular weight of 30,000 g/mol or more. However, the polyalkylene carbonate resin composition has a low molecule unit compatibility, which makes it difficult to achieve a synergistic effect of physical properties by mixing, and has insufficient improvement of transparency and mechanical strength such as robustness, and the like, and therefore, research into a polyalkylene carbonate resin composition for improving the above-described problems has been demanded.

RELATED ART DOCUMENT (Patent Document 1) U.S. Pat. No. 4,946,884 (Aug. 7, 1990)
(Patent Document 2) U.S. Pat. No. 4,912,149 (Mar. 27, 1990)
(Patent Document 3) Korean Patent Laid-Open Publication No. KR 10-2013-0124199 (Nov. 13, 2013)

SUMMARY

An embodiment of the present invention is directed to providing a polyalkylene carbonate resin composition capable of increasing compatibility through cross-linking of polyalkylene carbonate and an epoxy resin, remarkably improving thermal resistance of polyalkylene carbonate, and implementing excellent mechanical physical properties, adhesion, chemical resistance, and transparency.

In one general aspect, a polyalkylene carbonate resin composition having high thermal resistance includes: polyalkylene carbonate obtained by reacting carbon dioxide with one or two or more different epoxide compound(s) selected from the group consisting of C2-C10 alkylene oxide unsubstituted or substituted with halogen or alkoxy, C4-C20 cycloalkylene oxide unsubstituted or substituted with halogen or alkoxy, and C8-C20 styrene oxide unsubstituted or substituted with halogen, alkoxy, alkyl or aryl; an epoxy resin; and a curing agent.

In the polyalkylene carbonate resin composition having high thermal resistance, the epoxy resin may have 5 to 950 parts by weight based on 100 parts by weight of the polyalkylene carbonate, and the curing agent may have an equivalent corresponding to 0.8 to 1.2 times the equivalent of epoxide of the epoxy resin.

The polyalkylene carbonate may be represented by Chemical Formula 1 below:

[Chemical Formula 1]

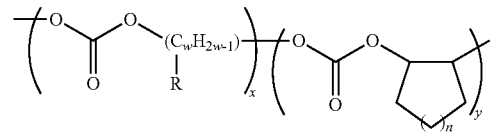

in Chemical Formula 1, w is an integer of 2 to 10, x is an integer of 3 to 300, y is an integer of 0 to 100, n is an integer of 1 to 3, and R is hydrogen, C1-C4 alkyl or —CH$_2$—O—R' (R' is C1-C8 alkyl).

In the polyalkylene carbonate resin composition having high thermal resistance, the polyalkylene carbonate may have a weight average molecular weight Mw of 500 to 30,000 g/mol.

In the polyalkylene carbonate resin composition having high thermal resistance, the polyalkylene carbonate may be any one or a mixture of two or more selected from the group consisting of polypropylene carbonate and polyethylene carbonate.

In the polyalkylene carbonate resin composition having high thermal resistance, the epoxy resin may be selected from the group consisting of a glycidyl ether-based compound, a glycidyl ester-based compound, amine-based compound, linear aliphatic epoxy compound, and an alicyclic epoxy compound.

In the polyalkylene carbonate resin composition having high thermal resistance, the curing agent may be any one or a mixture of two or more selected from the group consisting of an amine-based compound, an acid anhydride-based compound, a polyamide-based compound or an amide amine-based compound, an imidazole-based compound and a mercaptan-based compound.

In the polyalkylene carbonate resin composition having high thermal resistance, the amine-based compound may be any one selected from the group consisting of diethyl triamine, triethyl tetramine, diethyl propylamine, menthane diamine, normal aminoethyl piperazine, metaxylene diamine, isophorone diamine, norbornane diamine, meta-phenylene diamine, dimethyl aniline, diaminodiphenyl sulfone, tridimethylaminomethyl phenol, benzyldimethylamine, triethanolamine, triethyleneamine, dimethylaminoethanol, and mixtures thereof.

In the polyalkylene carbonate resin composition having high thermal resistance, the acid anhydride-based compound may be any one or a mixture of two or more selected from the group consisting of dodecenylsuccinic anhydride, methyltetrahydrophthalic anhydride, methylhexahydrophthalic anhydride, methyl himic anhydride, phthalic anhydride, maleic anhydride, trimellitic anhydride, pyromellitic anhydride, hexahydrophthalic anhydride, tertrahydrophthalic anhydride, nadic methyl anhydride and nadic anhydride.

In the polyalkylene carbonate resin composition having high thermal resistance, the polyamide-based compound or the amide amine-based compound may be a compound synthesized by using triethylenetetramine, diethylenetriamine, tetraethylenepentamine, cyanoguanidine, dicyandiamide, dimer acid, fatty acid, triethylenetetramine (TETA) or tetraethylenepentamine (TEPA) as raw materials.

In the polyalkylene carbonate resin composition having high thermal resistance, the imidazole-based compound may be any one or a mixture of two or more selected from the group consisting of 1-methylimidazole, 2-methylimidazole, 2-alkylimidazole having C10-C18 alkyl groups, 2-ethyl-4-methylimidazole, 2-phenylimidazole, 1-phenyl-2-methyl-imidazole, 2-heptadecylimidazole, 1-cyanoethyl-2-phenylimidazole-trimellitate, 2-($\beta$-(2'-methylimidazole-(1')))-ethyl-4-6-diamino-s-triazine, 2,4-dimethyl imidazole 2-undecyl imidazole, 2-heptadecenyl-4-methylimidazole, 2-heptadecyl imidazole, 2-phenyl-4-methylimidazole, 1-benzyl-2-methylimidazole, 2-ethylimidazole, 2-isopropylimidazole, 2-phenyl-4-benzylimidazole, 2-vinylimidazole, 1-vinyl-2-methylimidazole, 1-propyl-2-methylimidazol, 1-(3-aminopropyl)-imidazole, 1-butylimidazole, 1-cyanoethyl-2-methylimidazole, 1-cyanoethyl-2-ethyl-4-methylimidazole, 1-cyanoethyl-2-undecylimidazole, 1-guanamino-ethyl-2-methylimidazole, 1-cyanoethyl-2-isopropylimidazole, 1-cyanoethyl-2-phenylimidazole, 1-aminoethyl-2-methylimidazole, 2-phenyl-4,5-dihydroxymethylimidazole, 2-phenyl-4-methyl-5-hydroxymethylimidazole, 2-phenyl-4-benzyl-5-hydroxymethylimidazole, 2-methyl-4,5-diphenylimidazole, 2,3,5-triphenylimidazole, 2-styrylimidazole, 1-(dodecyl benzyl)-2-methylimidazole, 2-(2-hydroxyl-4-t-butylphenyl)-4,5-diphenylimidazole, 2-(2-methoxyphenyl)-4,5-diphenylimidazole, 2-(3-hydroxyphenyl)-4,5-diphenylimidazole, 2-(p-dimethyl-aminophenyl)-4,5-diphenylimidazole, 2-(2-hydroxyphenyl)-4,5-diphenylimidazole, di(4,5-diphenyl-2-imidazole)-benzene-1,4,2-naphthyl-4,5-diphenylimidazole, 1-benzyl-2-methylimidazole, and 2-p-methoxystyrylimidazole.

In the polyalkylene carbonate resin composition having high thermal resistance, the mercaptan-based compound may be any one or a mixture of two or more selected from the group consisting of pentaerythritol, tetrathioglycol, polysulfide, and trioxane trimethylene mercaptan.

The polyalkylene carbonate resin composition having high thermal resistance may further include: any one or two or more additive(s) selected from the group consisting of pigments, dyes, fillers, antioxidants, anti-static agents, anti-blocking agents, slip agents, kneading agents, sticking agents, leveling agents, fluorescent brightening agents, dispersants, thermal stabilizers, light stabilizers, ultraviolet light absorbers and lubricants.

In another general aspect, there is provided a molded article including the polyalkylene carbonate resin composition having high thermal resistance as described above.

DETAILED DESCRIPTION OF EMBODIMENTS

Hereinafter, a polyalkylene carbonate resin composition having high thermal resistance of the present invention is described in detail. The exemplary embodiments of the present invention to be described below are provided by way of example so that the idea of the present invention can be sufficiently transferred to those skilled in the art to which the present invention pertains. Here, unless technical and scientific terms used herein are defined otherwise, they have meanings generally understood by those skilled in the art to which the present invention pertains. Known functions and components which obscure the description and the accompanying drawings of the present invention with unnecessary detail will be omitted.

Term: "unsubstituted or substituted" in the present specification means that it is substituted with at least any one substituent selected from the group consisting of deuterium; halogen group; alkyl group; alkenyl group; alkoxy group; cycloalkyl group; silyl group; arylalkenyl group; aryl group; aryloxy group; alkylthioxy group; alkylsulfoxy group; arylsulfoxy group; boron group; alkylamine group; aralkyl amine group; arylamine group; heteroaryl group; carbazole group; arylamine group; aryl group; fluorenyl group; nitrile group; nitro group; hydroxy group; cyano group; and heterocyclic group including at least any one of O, N, S, Se, P, $SO_2$ or PO, or means that it does not have any substituents.

Herein, unless there is a specific definition for weight average molecular weight (unit: g/mol), the weight average molecular weight is obtained by dissolving a powder sample in tetrahydrofuran (THF), and measuring a weight average molecular weight of the sample by gel permeation chromatography (GPC; Agilent Technologies 1200 series). Here, a column is Shodex LF-804(8.0.1.D.×300 mm), and a standard sample is polystyrene (Shodex).

The present applicant found that transparency may be secured, excellent thermal resistance, adhesion and chemical resistance may be implemented, and mechanical physical properties such as impact strength, elastic deformation rate, compression deformation rate, tensile strength, and the like, may be maximized, through a uniform molecular structure obtained by introducing a cross-linked structure using an epoxy resin into polyalkylene carbonate, and filed the present invention.

The polyalkylene carbonate resin composition having high thermal resistance according to the present invention includes polyalkylene carbonate obtained by reacting carbon dioxide with one or two or more different epoxide compound(s) selected from the group consisting of C2-C10 alkylene oxide unsubstituted or substituted with halogen or alkoxy, C4-C20 cycloalkylene oxide unsubstituted or substituted with halogen or alkoxy, and C8-C20 styrene oxide unsubstituted or substituted with halogen, alkoxy, alkyl or aryl; an epoxy resin; and a curing agent.

In the polyalkylene carbonate resin composition having high thermal resistance according to the present invention, the epoxy resin may have 5 to 950 parts by weight based on 100 parts by weight of the polyalkylene carbonate. In addition, preferably, the curing agent may have an equivalent corresponding to 0.8 to 1.2 times the equivalent of epoxide of the epoxy resin.

In an exemplary embodiment, the polyalkylene carbonate resin composition may be obtained by putting the composition into a mold and performing a curing reaction. The curing reaction is not limited, but preferably, may be performed at 25 to 170° C. In addition, general molds or molds having desired shapes may be used as the mold, and the mold is not limited.

Further, in an exemplary embodiment, the polyalkylene carbonate resin composition according to the present invention may be applied to coating through a solution reaction, but is not necessarily limited thereto.

The polyalkylene carbonate in the present invention may be used as disclosed in previously filed applications (Korean Patent Laid-Open Publication Nos. 2008-0015454, 2009-0090154, 2010-0067593, and 2010-0013255) of which applicants are SK Innovation Co., Ltd.

The polyalkylene carbonate of the present invention is prepared by copolymerization reaction of carbon dioxide with one or more of epoxide compounds selected from the group consisting of (C2-C20)alkylene oxide unsubstituted or substituted with halogen, (C1-C20)alkyloxy, (C6-C20)aryloxy or (C6-C20)ar(C1-C20)alkyl(aralkyl)oxy; (C4-C20)cycloalkylene oxide unsubstituted or substituted with halogen, (C1-C20)alkyloxy, (C6-C20)aryloxy or (C6-C20)ar(C1-C20)alkyl(aralkyl)oxy; and (C8-C20) styrene oxide unsubstituted or substituted with halogen, (C1-C20)alkyloxy, (C6-C20)aryloxy, (C6-C20)ar(C1-C20)alkyl(aralkyl)oxy or (C1-C20)alkyl. Here, the epoxide compound may be any one or two or more selected from the group consisting of ethylene oxide, propylene oxide, butene oxide, pentene oxide, hexene oxide, octene oxide, decene oxide, dodecene oxide, tetradecene oxide, hexadecene oxide, octadecene oxide, butadiene monoxide, 1,2-epoxide-7-octene, epifluoro hydrin, epichloro hydrin, epibromo hydrin, glycidyl methyl ether, glycidyl ethyl ether, glycidyl normal propyl ether, glycidyl sec-butyl ether, glycidyl normal or isopentyl ether, glycidyl normal hexyl ether, glycidyl normal heptyl ether, glycidyl normal octyl or 2-ethyl-hexyl ether, glycidyl normal or isononyl ether, glycidyl normal decyl ether, glycidyl normal dodecyl ether, glycidyl normal tetradecyl ether, glycidyl normal hexadecyl ether, glycidyl normal octadecyl ether, glycidyl normal icocyl ether, isopropyl glycidyl ether, butyl glycidyl ether, t-butyl glycidyl ether, 2-ethylhexyl glycidyl ether, allyl glycidyl ether, cyclopentene oxide, cyclohexene oxide, cyclooctene oxide, cyclododecene oxide, alpha-pinene oxide, 2,3-epoxide norbornene, limonene oxide, dieldrin, 2,3-epoxide propyl benzene, styrene oxide, phenyl propylene oxide, stilbene oxide, chlorostilbene oxide, dichlorostilbene oxide, 1,2-epoxy-3-phenoxypropane, benzyl oxymethyl oxirane, glycidyl-methylphenyl ether, chlorophenyl-2,3-epoxide propyl ether, epoxypropyl methoxyphenyl ether, biphenyl glycidyl ether, glycidyl naphthyl ether, glycidyl acetic acid ester, glycidyl propionate, glycidyl butanoate, glycidyl normal pentanoate, glycidyl normal hexanoate, glycidyl heptanoate, glycidyl normal octanoate, glycidyl 2-ethyl hexanoate, glycidyl normal nonanoate, glycidyl normal decanoate, glycidyl normal dodecanoate, glycidyl normal tetradecanoate, glycidyl normal hexadecanoate, glycidyl normal octadecanoate, and glycidyl icosanoate.

The polyalkylene carbonate of the present invention may be represented by Chemical Formula 1 below:

[Chemical Formula 1]

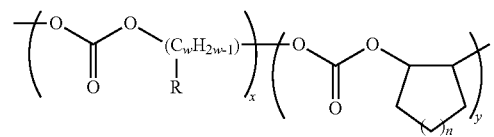

in Chemical Formula 1, w is an integer of 2 to 10, x is an integer of 3 to 300, y is an integer of 0 to 100, n is an integer of 1 to 3, and R is hydrogen, C1-C4 alkyl or —CH$_2$—O—R' (R' is C1-C8 alkyl).

Here, alkylene in the polyalkylene carbonate is not limited, but preferably, may be selected from the group consisting of ethylene, propylene, 1-butylene, cyclohexene oxide, alkylglycidyl ether, n-butyl and n-octyl.

The polyalkylene carbonate is not limited, but preferably, may be polypropylene carbonate or polyethylene carbonate obtained by copolymerizing carbon dioxide with propylene oxide or ethylene oxide.

That is, the polypropylene carbonate or the polyethylene carbonate is preferred.

The polyalkylene carbonate of the present invention is prepared by alternately copolymerizing carbon dioxide with one or more of epoxide compounds selected from the group consisting of (C2-C20)alkylene oxide unsubstituted or substituted with halogen, (C1-C20)alkyloxy, (C6-C20)aryloxy or (C6-C20)ar(C1-C20)alkyl(aralkyl)oxy; (C4-C20)cycloalkylene oxide unsubstituted or substituted with halogen, (C1-C20)alkyloxy, (C6-C20)aryloxy or (C6-C20)ar(C1-C20)alkyl(aralkyl)oxy; and (C8-C20) styrene oxide unsubstituted or substituted with halogen, (C1-C20)alkyloxy, (C6-C20)aryloxy, (C6-C20)ar(C1-C20)alkyl(aralkyl)oxy or (C1-C20)alkyl, in the presence of a polymer compound including hydroxyl or carboxylic acid groups at an end group or a side chain, by using a complex represented by Chemical Formula 2 below as a catalyst:

[Chemical Formula 2]

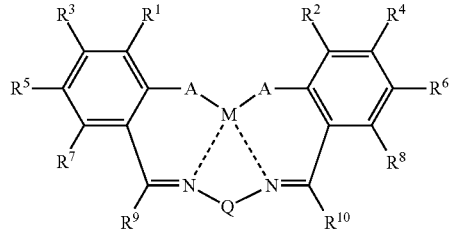

in Chemical Formula 2,
M is trivalent cobalt or trivalent chromium;
A is an oxygen atom or a sulfur atom;
Q is diradical linking two nitrogen atoms;
$R^1$ to $R^{10}$ are each independently hydrogen; halogen; (C1-C20)alkyl; (C1-C20)alkyl including one or more of halogen, nitrogen, oxygen, silicon, sulfur and phosphorus; (C2-C20)alkenyl; (C2-C20)alkenyl including one or more of halogen, nitrogen, oxygen, silicon, sulfur and phosphorus; (C1-C20)alkyl(C6-C20)aryl; (C1-C20)alkyl(C6-C20)aryl including one or more of halogen, nitrogen, oxygen, silicon, sulfur and phosphorus; (C6-C20)aryl(C1-C20)alkyl; (C6-C20)aryl(C1-C20)alkyl including one or more of halogen, nitrogen, oxygen, silicon, sulfur and phosphorus; (C1-C20)alkoxy; (C6-C30)aryloxy; formyl; (C1-C20)alkylcarbonyl;

(C6-C20)arylcarbonyl; or a metalloid radical of Group 14 metal substituted with hydrocarbyl;

two of $R^1$ to $R^{10}$ may be linked to each other to form a ring;

at least one of the hydrogen included in the $R^1$ to $R^{10}$ and Q is a protonated group selected from the group consisting of Chemical Formula a, Chemical Formula b and Chemical Formula c below:

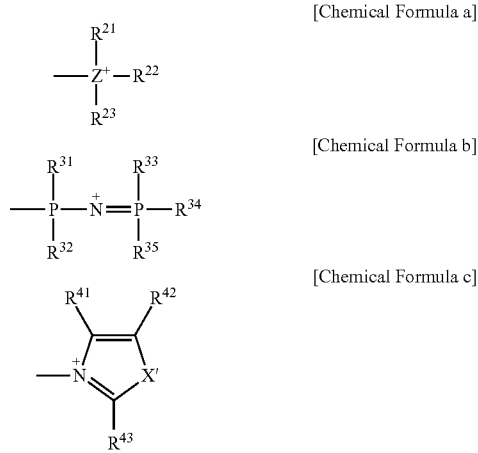

[Chemical Formula a]

[Chemical Formula b]

[Chemical Formula c]

$X^-$ is independently a halogen anion; $HCO_3^-$; $BF_4^-$; $ClO_4^-$; $NO_3^-$; $PF_6^-$; (C6-C20)aryloxy anion; (C6-C20)aryloxy anion including one or more of halogen, nitrogen, oxygen, silicon, sulfur and phosphorus atoms; (C1-C20)alkylcarboxy anion; (C1-C20)alkylcarboxy anion including one or more of halogen, nitrogen, oxygen, silicon, sulfur and phosphorus atoms; (C6-C20)arylcarboxy anion; (C6-C20)arylcarboxy anion including one or more of halogen, nitrogen, oxygen, silicon, sulfur and phosphorus atoms; (C1-C20)alkoxy anion; (C1-C20)alkoxy anion including one or more of halogen, nitrogen, oxygen, silicon, sulfur and phosphorus atoms; (C1-C20)alkylcarbonate anion; (C1-C20)alkylcarbonate anion including one or more of halogen, nitrogen, oxygen, silicon, sulfur and phosphorus atoms; (C6-C20)arylcarbonate anion; (C6-C20)arylcarbonate anion including one or more of halogen, nitrogen, oxygen, silicon, sulfur and phosphorus atoms; (C1-C20)alkylsulfonate anion; (C1-C20)alkylsulfonate anion including one or more of halogen, nitrogen, oxygen, silicon, sulfur and phosphorus atoms; (C1-C20)alkylamido anion; (C1-C20)alkylamido anion including one or more of halogen, nitrogen, oxygen, silicon, sulfur and phosphorus atoms; (C6-C20)arylamido anion; (C6-C20)arylamido anion including one or more of halogen, nitrogen, oxygen, silicon, sulfur and phosphorus atoms; (C1-C20)alkylcarbamate anion; (C1-C20)alkylcarbamate anion including one or more of halogen, nitrogen, oxygen, silicon, sulfur and phosphorus atoms; (C6-C20)arylcarbamate anion; or (C6-C20)arylcarbamate anion including one or more of halogen, nitrogen, oxygen, silicon, sulfur and phosphorus atoms;

Z is a nitrogen atom or a phosphorus atom;

$R^{21}$, $R^{22}$, $R^{23}$, $R^{31}$, $R^{32}$, $R^{33}$, $R^{34}$ and $R^{35}$ are independently (C1-C20)alkyl; (C1-C20)alkyl including one or more of halogen, nitrogen, oxygen, silicon, sulfur and phosphorus; (C2-C20)alkenyl; (C2-C20)alkenyl including one or more of halogen, nitrogen, oxygen, silicon, sulfur and phosphorus; (C1-C20)alkyl(C6-C20)aryl; (C1-C20)alkyl(C6-C20)aryl including one or more of halogen, nitrogen, oxygen, silicon, sulfur and phosphorus; (C6-C20)aryl(C1-C20)alkyl; (C6-C20)aryl(C1-C20)alkyl including one or more of halogen, nitrogen, oxygen, silicon, sulfur and phosphorus; or a metalloid radical of Group 14 metal substituted with hydrocarbyl; and two of $R^{21}$, $R^{22}$ and $R^{23}$ or two of $R^{31}$, $R^{32}$, $R^{33}$, $R^{34}$ and $R^{35}$ may be linked to each other to form a ring;

$R^{41}$, $R^{42}$ and $R^{43}$ are each independently hydrogen; (C1-C20)alkyl; (C1-C20)alkyl including one or more of halogen, nitrogen, oxygen, silicon, sulfur and phosphorus; (C2-C20)alkenyl; (C2-C20)alkenyl including one or more of halogen, nitrogen, oxygen, silicon, sulfur and phosphorus; (C1-C20)alkyl(C6-C20)aryl; (C1-C20)alkyl(C6-C20)aryl including one or more of halogen, nitrogen, oxygen, silicon, sulfur and phosphorus; (C6-C20)aryl(C1-C20)alkyl; (C6-C20)aryl(C1-C20)alkyl including one or more of halogen, nitrogen, oxygen, silicon, sulfur and phosphorus; or a metalloid radical of Group 14 metal substituted with hydrocarbyl; and two of $R^{41}$, $R^{42}$ and $R^{43}$ may be linked to each other to form a ring;

X' is an oxygen atom, a sulfur atom or N—R (wherein R is (C1-C20)alkyl);

n is an integer obtained by adding 1 to the total number of the protonated groups included in $R^1$ to $R^{10}$ and Q;

$X^-$ may be coordinated with M; and a nitrogen atom of imine may be de-coordinated from M.

The polyalkylene carbonate according to an exemplary embodiment of the present invention may have a weight average molecular weight Mw of 500 to 30,000 g/mol. When the polyalkylene carbonate satisfies the above-described range of the weight average molecular weight, an excellent synergistic effect of physical properties such as thermal resistance, transparency, adhesion, mechanical rigidity, and the like, may be implemented by combination of the polyalkylene carbonate with other components in the composition. The weight average molecular weight of the polyalkylene carbonate may be 1,000 to 25,000 g/mol, more preferably, 1,000 to 10,000 g/mol, and much more preferably, 1,000 to 5,000 g/mol.

In addition, the polyalkylene carbonate may have a glass transition temperature (Tg) of −10° C. to 40° C. When the polyalkylene carbonate satisfies the glass transition temperature in the above-described range, it is easy to combine the polyalkylene carbonate with the epoxy resin, and compatibility thereof may be maximized.

In addition, the polyalkylene carbonate may have a specific gravity of 1.15 to 1.35 g/cm³, but is not limited thereto. When the polyalkylene carbonate satisfies the above-described range, compatibility and processability may be excellent, and a synergistic effect of thermal resistance, transparency, and mechanical physical properties may be implemented.

The polyalkylene carbonate in the present invention may achieve cross-linking with the epoxy resin through the curing reaction. Specifically, the curing reaction may be performed by a hydroxyl group present in a chain of the polyalkylene carbonate, and the curing agent. Here, degree of chemical bond of the curing agent with the polyalkylene carbonate may vary depending on kinds of the curing agent. However, the kind of the curing agent is not limited in the present invention, but may be used without limitation as long as it is a curing agent capable of achieving cross-linking of the polyalkylene carbonate with the epoxy resin. In addition, the polyalkylene carbonate resin composition in the present invention may further include a curing accelerator while simultaneously including the curing agent. The polyalkylene carbonate resin composition having high thermal resistance according to an exemplary embodiment of the present invention may include the polyalkylene carbonate, the epoxy resin, and the curing agent, wherein the epoxy resin has 5 to 950 parts by weight, preferably, 30 to 900 parts by weight, based on 100 parts by weight of the polyalkylene carbonate, and the curing agent has an equivalent corresponding to 0.8 to 1.2 times the equivalent of epoxide of the epoxy resin. When the epoxy resin and the curing agent are out of the above-described range, non-reacted epoxide may remain or degree of cross-linking by curing may not be sufficient, and accordingly, it is difficult to implement desired effects.

The epoxy resin has small reaction shrinkage after the curing process and does not cause volatile materials, such that excellent moldability and processability may be secured, and the epoxy resin may be applied to a solvent free process.

In addition, mechanical physical properties and transparency may be implemented by combination of the polyalkylene carbonate with the epoxy resin. Examples of the epoxy resin may include a glycidyl ether-based compound, a glycidyl ester-based compound, a glycidyl amine-based compound, a linear aliphatic epoxy compound, an alicyclic epoxy compound, and the like, but is not necessarily limited thereto. The epoxy resin may have preferably two or three or more functional groups. Here, the epoxy resin may have a weight average molecular weight of 180 to 10,000 g/mol. When the epoxy resin satisfies the weight average molecular weight in the above-described range, compatibility of the epoxy resin with the polyalkylene carbonate resin may be maximized to implement excellent transparency and to improve thermal resistance and mechanical physical properties after the curing reaction.

The curing agent in the present invention is not limited, but may be any one or a mixture of two or more selected from the group consisting of an amine-based curing agent, an acid anhydride-based curing agent, a polyamide-based curing agent or an amide amine-based curing agent, an imidazole-based curing agent and a mercaptan-based curing agent.

The amine-based curing agent may be any one or a mixture of two or more selected from the group consisting of linear amine, aliphatic amine, modified aliphatic amine, aromatic amine, alicyclic amine, secondary amine and tertiary amine, but is not necessarily limited thereto. Specifically, the amine-based curing agent may be any one or a mixture of two or more selected from the group consisting of diethyl triamine, triethyl tetramine, diethyl propylamine, menthane diamine, normal aminoethyl piperazine, metaxylene diamine, isophorone diamine, norbornane diamine, metaphenylene diamine, dimethyl aniline, diaminodiphenyl sulfone, tridimethylaminomethyl phenol, benzyldimethylamine, triethanolamine, triethyleneamine, dimethylaminoethanol, and mixtures thereof.

The acid anhydride-based curing agent may be any one or a mixture of two or more selected from the group consisting of dodecenylsuccinic anhydride, methyltetrahydrophthalic anhydride, methylhexahydrophthalic anhydride, methyl himic anhydride, phthalic anhydride, maleic anhydride, trimellitic anhydride, pyromellitic anhydride, hexahydrophthalic anhydride, tertrahydrophthalic anhydride, nadic methyl anhydride, and nadic anhydride, but is not necessarily limited thereto.

The polyamide-based curing agent or the amide amine-based curing agent may be a compound synthesized by using triethylenetetramine, diethylenetriamine, tetraethylenepentamine, cyanoguanidine, dicyandiamide, dimer acid, fatty acid, triethylenetetramine (TETA) or tetraethylenepentamine (TEPA) as raw materials, but is not necessarily limited thereto.

The imidazole-based curing agent may be any one or a mixture of two or more selected from the group consisting of 1-methylimidazole, 2-methylimidazole, 2-alkylimidazole having C10-C18 alkyl groups, 2-ethyl-4-methylimidazole, 2-phenylimidazole, 1-phenyl-2-methylimidazole, 2-heptadecylimidazole, 1-cyanoethyl-2-phenylimidazole-trimellitate, 2-(β-(2'-methylimidazole-(1')))-ethyl-4-6-diamino-s-triazine, 2,4-dimethyl imidazole 2-undecyl imidazole, 2-phenyl-4-methylimidazole, 1-benzyl-2-methylimidazole, 2-ethylimidazole, 2-isopropylimidazole, 2-phenyl-4-benzylimidazole, 2-vinylimidazole, 1-vinyl-2-methylimidazole, 1-propyl-2-methylimidazol, 1-(3-aminopropyl)-imidazole, 1-butylimidazole, 1-cyanoethyl-2-methylimidazole, 1-cyanoethyl-2-ethyl-4-methylimidazole, 1-cyanoethyl-2-undecylimidazole, 1-guanaminoethyl-2-methylimidazole, 1-cyanoethyl-2-isopropylimidazole, 1-cyanoethyl-2-phenylimidazole, 1-aminoethyl-2-methylimidazole, 2-phenyl-4,5-dihydroxymethylimidazole, 2-phenyl-4-methyl-5-hydroxymethylimidazole, 2-phenyl-4-benzyl-5-hydroxymethylimidazole, 2-methyl-4,5-diphenylimidazole, 2,3,5-triphenylimidazole, 2-styrylimidazole, 1-(dodecyl benzyl)-2-methylimidazole, 2-(2-hydroxyl-4-t-butylphenyl)-4,5-diphenylimidazole, 2-(2-methoxyphenyl)-4,5-diphenylimidazole, 2-(3-hydroxyphenyl)-4,5-diphenylimidazole, 2-(p-dimethyl-aminophenyl)-4,5-diphenylimidazole, 2-(2-hydroxyphenyl)-4,5-diphenylimidazole, di(4,5-diphenyl-2-imidazole)-benzene-1,4,2-naphthyl-4,5-diphenylimidazole, 1-benzyl-2-methylimidazole, and 2-p-methoxystyrylimidazole.

The mercaptan-based curing agent is referred to as polymercaptan, and may be any one or a mixture of two or more selected from the group consisting of pentaerythritol, tetrathioglycol, polysulfide, and trioxane trimethylene mercaptan, but is not necessarily limited thereto.

In addition, the polyalkylene carbonate resin composition may further include the curing accelerator in achieving cross-linking through the curing reaction of the polyalkylene carbonate and the epoxy resin by using the curing agent in the composition. Here, the curing accelerator is not limited, but preferably, may be tridimethylaminomethyl phenol.

The polyalkylene carbonate resin composition having high thermal resistance according to an exemplary embodiment of the present invention may further include: any one or two or more additive(s) selected from the group consisting of pigments, dyes, fillers, antioxidants, anti-static agents, anti-blocking agents, slip agents, kneading agents, sticking agents, leveling agents, fluorescent brightening agents, dispersants, thermal stabilizers, light stabilizers, ultraviolet light absorbers and lubricants, if needed, but is not necessarily limited thereto.

The present invention provides a molded article including the polyalkylene carbonate resin composition having high thermal resistance as described above.

Hereinafter, the present invention will be more appreciated by the following examples, which are given by way of illustration but are not intended to limit the protective scope defined by the attached claims of the present invention.

EXAMPLE

Samples each having a size of 9 cm×5 cm×0.2 cm were manufactured by putting polyalkylene carbonate resin compositions in molds, the polyalkylene carbonate resin composition being obtained by mixing polypropylene carbonate (PPC) of which a weight average molecular weight is 1,000 g/mol or 2,200 g/mol, a glycidyl ether-based epoxy compound (Kukdo Chemical Co., Ltd., YD-128, YD-012), with a polyamide-based curing agent (Kukdo Chemical Co., Ltd., G5022) or an acid anhydride-based curing agent (Kukdo Chemical Co., Ltd., HJ5900) or a curing accelerator (tridimethylaminomethyl phenol (Kukdo Chemical Co., Ltd., K-54) according to compositions shown in Table 1 below, and performing a curing process, and then cooling the obtained products to room temperature, and separating the cooled products from the mold. Here, when the polyamide-based curing agent was used, the curing process was performed at 80° C. for 3 hours and at 100° C. for 3 hours, and when the acid anhydride-based curing agent was used, the curing process was performed at 80° C. for 3 hours and at 100° C. for 1 hour and at 150° C. for 1 hour.

TABLE 1

| Classification | Polypropylene Carbonate Content (g) | | | Epoxy Resin Content (g) | | Curing Agent Content (g) | | |
|---|---|---|---|---|---|---|---|---|
| | MW 1,000 (g/mol) | MW 2,200 (g/mol) | MW 20,000 (g/mol) | YD-128 | YD-012 | G-5022 | HJ-5900 | K-54 |
| Example 1 | 10 | — | — | 90 | — | 90 | — | — |
| Example 2 | 10 | — | — | 90 | — | — | 80 | 0.45 |
| Example 3 | 30 | — | — | 70 | — | 70 | — | — |
| Example 4 | 30 | — | — | 70 | — | — | 60 | 0.35 |
| Example 5 | 50 | — | — | 50 | — | 50 | — | — |
| Example 6 | 50 | — | — | 50 | — | — | 45 | 0.25 |
| Example 7 | 50 | — | — | — | 50 | — | 15 | 0.1 |
| Example 8 | — | 50 | — | 50 | — | 50 | — | — |
| Example 9 | — | 50 | — | 50 | — | — | 45 | 0.25 |
| Comparative Example 1 | 100 | — | — | — | — | — | — | — |
| Comparative Example 2 | — | 100 | — | — | — | — | — | — |
| Comparative Example 3 | — | — | 100 | — | — | — | — | — |
| Comparative Example 4 | — | — | — | 100 | — | 100 | — | — |
| Comparative Example 5 | — | — | — | 100 | — | — | 90 | 0.5 |

Physical properties of the samples were measured as follows.

(1) Thermal Stability:

Glass transition temperature of the manufactured samples and temperature at which 50% of the polyalkylene carbonate resin compositions are decomposed were measured by differential scanning calorimeter (DSC) and thermogravimetric analyzer (TGA).

(2) Transmittance (TT) and Haze (Unit: %):

Transmittance and haze of the manufactured samples were measured by a spectral haze meter (TC-H3DPK-MK11).

(3) Adhesion:

Adhesion was measured by a peel-off test method (10×10 Cross cut) according to an evaluation method defined by ISO 2409.

(4) Hardness:

Pencil hardness was measured according to an evaluation method defined by JIS K 5401.

(5) Tensile Strength:

Stress at break was measured according to an evaluation method defined by ASTM D638.

TABLE 2

| Classification | Thermal stability | | Transparency | | | Mechanical Strength | | |
|---|---|---|---|---|---|---|---|---|
| | Tg (° C.) | Temperature at which 50% of polyalkylene carbonate resin composition is decomposed. | Thickness (μm) | Haze (%) | TT (%) | Peel-off (%) | Hardness | Stress at Break (kgf/cm²) |
| Example 1 | 70.12 | 392 | 150 | 2.53 | 91.35 | 0 | 2H | 743 |
| Example 2 | 97.33 | 402 | 140 | 3.55 | 90.65 | 0 | 4H | 783 |
| Example 3 | 51.23 | 375 | 150 | 3.43 | 89.56 | 0 | H | 701 |
| Example 4 | 68.65 | 387 | 160 | 2.81 | 90.86 | 0 | 3H | 755 |
| Example 5 | 46.23 | 325 | 150 | 5.23 | 89.84 | 0 | B | 675 |
| Example 6 | 56.13 | 338 | 150 | 2.65 | 90.50 | 0 | 2H | 712 |
| Example 7 | 55.23 | 337 | 130 | 6.85 | 87.52 | 2 | H | 688 |
| Example 8 | 45.62 | 342 | 150 | 5.36 | 89.88 | 0 | F | 667 |
| Example 9 | 56.04 | 358 | 140 | 4.78 | 89.50 | 1 | H | 692 |
| Comparative Example 1 | −1.99 | 235 | 160 | 1.15 | 91.99 | 99 | — | — |
| Comparative Example 2 | 14.78 | 242 | 140 | 1.25 | 91.85 | 98 | 4B | 334 |
| Comparative Example 3 | 22.35 | 268 | 160 | 2.85 | 90.89 | 99 | B | 361 |
| Comparative Example 4 | 92.58 | 422 | 150 | 6.25 | 90.56 | 0 | 6H | 782 |
| Comparative Example 5 | 125.6 | 425 | 150 | 4.52 | 90.50 | 0 | 7H | 815 |

As shown in Table 2, it may be confirmed that Examples 1 to according to the present invention may implement excellent mechanical strength and transparency and significantly improved thermal stability by using the compositions including the polyalkylene carbonate resin of which the weight average molecular weight is 1,000 g/mol or 2,200 g/mol, the epoxy resin, and the curing agent. Meanwhile, Comparative Examples 1 to 3 did not include the epoxy resin and the curing agent, such that thermal stability was remarkably deteriorated and mechanical strength such as adhesion, and the like, were low. In addition, Comparative Example 4 or 5 exhibited excellent thermal stability, but significantly deteriorated transparency.

The polyalkylene carbonate resin composition having high thermal resistance according to the present invention may implement excellent thermal resistance, chemical resistance, adhesion and transparency, and may improve mechanical physical properties such as impact strength, elastic deformation rate, compression deformation rate, tensile strength, and the like, thereby being applicable to various industrial fields.

Hereinabove, although the present invention is described by specific matters, limited exemplary embodiments, and drawings, they are provided only for assisting in the entire understanding of the present invention. Therefore, the present invention is not limited to the exemplary embodiments. Various modifications and changes may be made by those skilled in the art to which the present invention pertains from this description.

Therefore, the sprit of the present invention should not be limited to the above-described exemplary embodiments, and the following claims as well as all modified equally or equivalently to the claims are intended to fall within the scope and spirit of the invention.

What is claimed is:

1. A polyalkylene carbonate resin composition comprising:
    polyalkylene carbonate obtained by reacting carbon dioxide with one or two or more different epoxide compound(s) selected from the group consisting of C2-C10 alkylene oxide unsubstituted or substituted with halogen or alkoxy, C4-C20 cycloalkylene oxide unsubstituted or substituted with halogen or alkoxy, and C8-C20 styrene oxide unsubstituted or substituted with halogen, alkoxy, alkyl or aryl, wherein the polyalkylene carbonate has a weight average molecular weight of 1,000 to 5,000 g/mol;
    an epoxy resin; and
    a curing agent.

2. The polyalkylene carbonate resin composition of claim 1, wherein the epoxy resin has 5 to 950 parts by weight based on 100 parts by weight of the polyalkylene carbonate, and the curing agent has an equivalent corresponding to 0.8 to 1.2 times the equivalent of epoxide of the epoxy resin.

3. A molded article comprising the polyalkylene carbonate resin composition of claim 2.

4. The polyalkylene carbonate resin composition of claim 1, wherein the polyalkylene carbonate is any one or a mixture of two or more selected from the group consisting of polypropylene carbonate and polyethylene carbonate.

5. A molded article comprising the polyalkylene carbonate resin composition of claim 4.

6. The polyalkylene carbonate resin composition of claim 1, wherein the polyalkylene carbonate is represented by Chemical Formula 1 below:

[Chemical Formula 1]

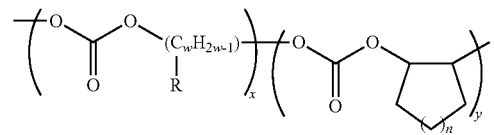

in Chemical Formula 1, w is an integer of 2 to 10, x is an integer of 3 to 300, y is an integer of 0 to 100, n is an integer of 1 to 3, and R is hydrogen, C1-C4 alkyl or —CH$_2$—O—R' (R' is C1-C8 alkyl).

7. A molded article comprising the polyalkylene carbonate resin composition of claim 6.

8. The polyalkylene carbonate resin composition of claim 1, wherein the epoxy resin is any one or a mixture of two or more selected from the group consisting of a glycidyl ether-based compound, a glycidyl ester-based compound, a glycidyl amine-based compound, a linear aliphatic epoxy compound, and an alicyclic epoxy compound.

9. A molded article comprising the polyalkylene carbonate resin composition of claim 8.

10. The polyalkylene carbonate resin composition of claim 1, wherein the epoxy resin has a weight average molecular weight of 180 to 10,000 g/mol.

11. A molded article comprising the polyalkylene carbonate resin composition of claim 10.

12. The polyalkylene carbonate resin composition of claim 1, wherein the curing agent is any one or a mixture of two or more selected from the group consisting of an amine-based compound, an acid anhydride-based compound, a polyamide-based compound or an amide amine-based compound, an imidazole-based compound and a mercaptan-based compound.

13. The polyalkylene carbonate resin composition of claim 12, wherein the amine-based compound is any one selected from the group consisting of diethyl triamine, triethyl tetramine, diethyl propylamine, menthane diamine, normal aminoethyl piperazine, metaxylene diamine, isophorone diamine, norbornane diamine, metaphenylene diamine, dimethyl aniline, diaminodiphenyl sulfone, tridimethylaminomethyl phenol, benzyldimethylamine, triethanolamine, triethyleneamine, dimethylaminoethanol, and mixtures thereof.

14. The polyalkylene carbonate resin composition of claim 12, wherein the acid anhydride-based compound is any one selected from the group consisting of dodecenylsuccinic anhydride, methyltetrahydrophthalic anhydride, methylhexahydrophthalic anhydride, methyl himic anhydride, phthalic anhydride, maleic anhydride, trimellitic anhydride, pyromellitic anhydride, hexahydrophthalic anhydride, tertrahydrophthalic anhydride, nadic methyl anhydride, nadic anhydride, and mixtures thereof.

15. The polyalkylene carbonate resin composition of claim 12, wherein the polyamide-based compound or the amide amine-based compound is selected from the group consisting of triethylenetetramine, diethylenetriamine, tetraethylenepentamine, cyanoguanidine, dicyandiamide, dimer acid, and fatty acid.

16. The polyalkylene carbonate resin composition of claim 12, wherein the imidazole-based compound is any one selected from the group consisting of 1-methylimidazole, 2-methylimidazole, 2-alkylimidazole having C10-C18 alkyl groups, 2-ethyl-4-methylimidazole, 2-phenylimidazole, 1-phenyl-2-methylimidazole, 2-heptadecylimidazole, 1-cyanoethyl-2-phenylimidazole-trimellitate, 2-(β-(2'-methylimidazole-(1')))-ethyl-4-6-diamino-s-triazine, 2,4-dimethyl imidazole 2-undecyl imidazole, 2-heptadecenyl-4-methylimidazole, 2-heptadecyl imidazole, 2-phenyl-4-methylimidazole, 1-benzyl-2-methylimidazole, 2-ethylimidazole, 2-isopropylimidazole, 2-phenyl-4-benzylimidazole, 2-vinylimidazole, 1-vinyl-2-methylimidazole, 1-propyl-2-methylimidazol, 1-(3-aminopropyl)-imidazole, 1-butylimidazole, 1-cyanoethyl-2-methylimidazole, 1-cyanoethyl-2-ethyl-4-methylimidazole, 1-cyanoethyl-2-undecylimidazole, 1-guanaminoethyl-2-methylimidazole, 1-cyanoethyl-2-isopropylimidazole, 1-cyanoethyl-2-phenylimidazole, 1-aminoethyl-2-methylimidazole, 2-phenyl-4,5-dihydroxymethylimidazole, 2-phenyl-4-methyl-5-hydroxymethylimidazole, 2-phenyl-4-benzyl-5-hydroxymethylimidazole, 2-methyl-4,5-diphenylimidazole, 2,3,5-triphenylimidazole, 2-styrylimidazole, 1-(dodecyl benzyl)-2-methylimidazole, 2-(2-hydroxyl-4-t-butylphenyl)-4,5-diphenylimidazole, 2-(2-methoxyphenyl)-4,5-diphenylimidazole, 2-(3-hydroxyphenyl)-4,5-diphenylimidazole, 2-(p-dimethyl-aminophenyl)-4,5-diphenylimidazole, 2-(2-hydroxyphenyl)-4,5-diphenylimidazole, di(4,5-diphenyl-2-imidazole)-benzene-1,4,2-naphthyl-4,5-diphenylimidazole, 1-benzyl-2-methylimidazole, 2-p-methoxystyrylimidazole, and mixtures thereof.

17. The polyalkylene carbonate resin composition of claim 12, wherein the mercaptan-based compound is any one or more selected from the group consisting of pentaerythritol, tetrathioglycol, polysulfide, and trioxane trimethylene mercaptan.

18. The polyalkylene carbonate resin composition of claim 1, wherein the polyalkylene carbonate has a specific gravity of 1.15 to 1.35 g/cm$^3$.

19. The polyalkylene carbonate resin composition of claim 1, further comprising:
    an additive selected from the group consisting of pigments, dyes, fillers, antioxidants, anti-static agents, anti-blocking agents, slip agents, kneading agents, sticking agents, leveling agents, fluorescent brightening agents, dispersants, thermal stabilizers, light stabilizers, ultraviolet light absorbers and lubricants.

20. A molded article comprising the polyalkylene carbonate resin composition of claim 1.

* * * * *